United States Patent [19]

Berrios

[11] Patent Number: 4,920,733
[45] Date of Patent: May 1, 1990

[54] SELF-PROPELLED, WALK-BEHIND, HYDRAULIC MOTOR-OPERATED MOWER

[76] Inventor: Joseph E. Berrios, 975 NW. 114th Ave., Coral Springs, Fla. 33071

[21] Appl. No.: 417,506

[22] Filed: Oct. 5, 1989

[51] Int. Cl.$^5$ ............................................ A01D 35/12
[52] U.S. Cl. ...................................... 56/10.9; 56/11.4
[58] Field of Search .............. 56/10.1, 10.2, 10.8–10.9, 56/11.4, 11.9, 13.5, 16.7, DIG. 9, DIG. 11, DIG. 15; 180/6.48

[56] References Cited

U.S. PATENT DOCUMENTS

| | | | |
|---|---|---|---|
| 2,329,372 | 9/1943 | Hitch | 56/11.4 X |
| 2,601,752 | 7/1952 | Rose | 56/10.9 |
| 3,616,869 | 11/1971 | Rilling | 180/6.48 |
| 3,816,985 | 6/1974 | Sorenson et al. | 56/10.9 X |
| 4,835,949 | 6/1989 | Seyerle | 56/10.8 |

*Primary Examiner*—Thuy M. Bui
*Attorney, Agent, or Firm*—Oltman and Flynn

[57] ABSTRACT

The present walk-behind, self-propelled motor has two hydraulic motors whose rotors are directly connected to the hubs of respective drive wheels on opposite sides of the mower deck toward the rear. These motors are driven by respective pumps, each of which has its direction and rate of fluid displacement controlled by a handle mechanism on the upper end of a corresponding fixed handle extending up from the deck at the rear. Each handle mechanism has a pivoted handle coating with a locking lever to set the corresponding pump in neutral, forward or reverse. An internal combustion engine drives both pumps as well as cutting blades located below the mower deck toward the front. Vertically pivoted wheels are located in front of the mower deck.

16 Claims, 5 Drawing Sheets

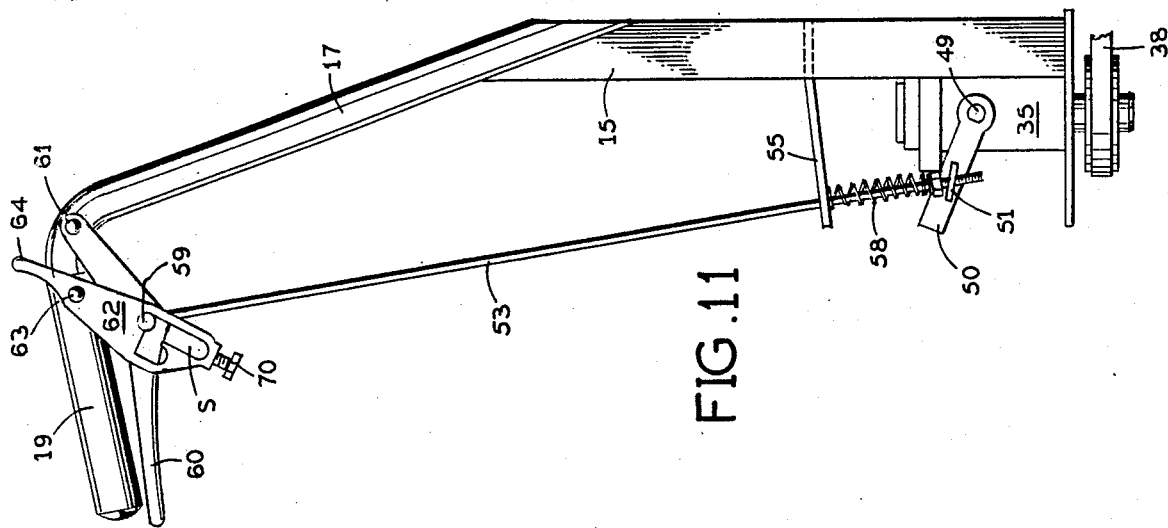
FIG.11
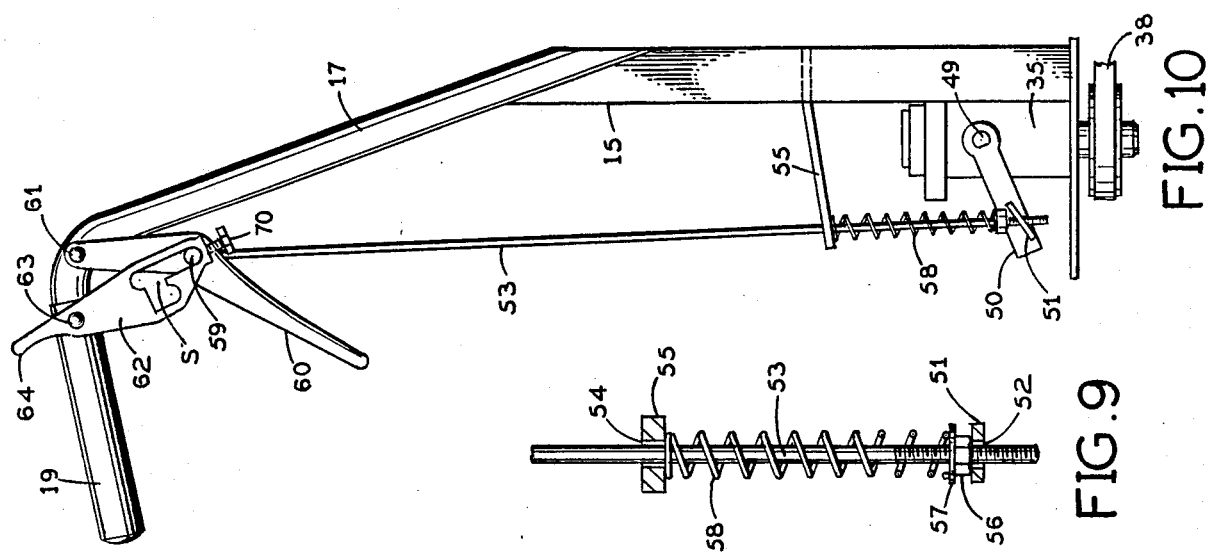
FIG.10
FIG.9
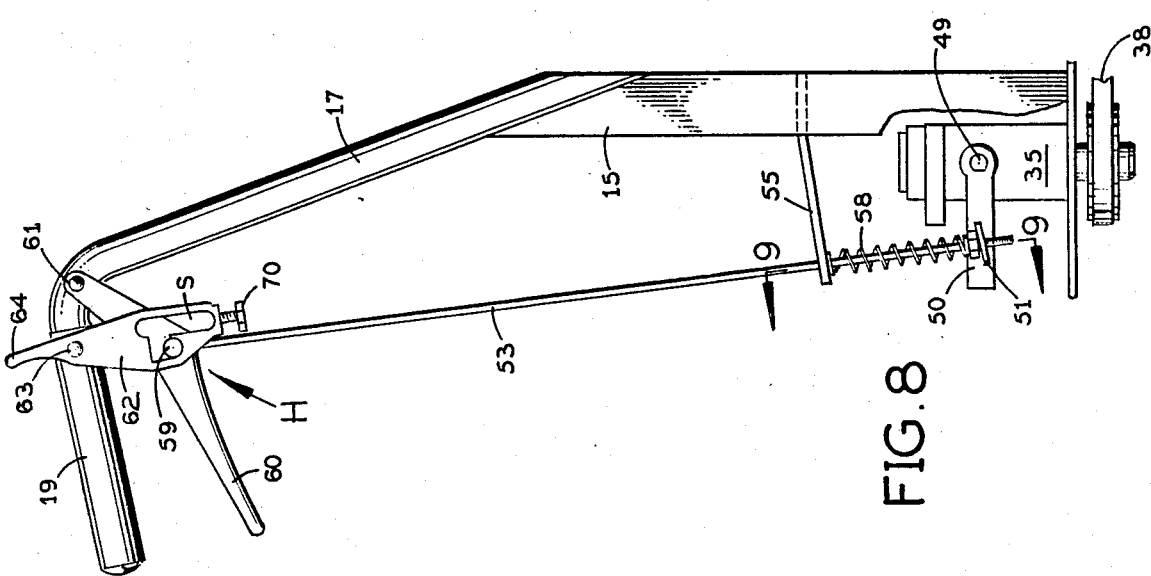
FIG.8

SELF-PROPELLED, WALK-BEHIND, HYDRAULIC MOTOR-OPERATED MOWER

SUMMARY OF THE INVENTION

This invention relates to a walk-behind self-propelled mower whose drive wheels are powered by hydraulic motors.

A principal object of this invention is to provide such a mower whose movements can be started, stopped and precisely controlled in direction by conveniently operably handle mechanisms.

Another object of this invention is to provide such a mower which combines the capability of cutting a wide swath of grass with relatively easy and precise maneuverability.

Preferably, the present mower has an internal combustion engine for driving two pulleys located below the rear section of the mower deck. One pulley, coupled to the engine through an electric clutch, drives rotary cutting blades located toward the front of the mower. The other pulley, coupled directly to the engine, drives two pumps which operate two reversible hydraulic motors, one on each drive wheel on opposite sides of the deck toward the back of the mower. Each pump has a control trunnion that is rotatively adjustable to control the direction and rate of fluid displacement of that pump. Each control trunnion is mechanically coupled to a corresponding handle mechanism that can be quickly and conveniently manipulated to set the corresponding pump in neutral, forward or reverse and to change the pump setting whenever desired, so that the mower's movement over the ground is promptly responsive to the user's commands.

Further objects and advantages of this invention will be apparent from the following detailed description of a presently-preferred embodiment shown in the accompanying drawings.

DESCRIPTION OF THE DRAWINGS

FIG. 6 is a fragmentary side elevation showing the handle mechanism on the left side for controlling the fluid displacement and direction of a corresponding pump in the mower, taken from the line 6—6 in FIG. 3;

FIG. 7 is a cross-section taken along the line 7—7 in FIG. 6;

FIG. 8 is a side elevation showing the handle mechanism and the pump on the right side of the mower, taken from the line 8—8 in FIG. 3, with the pump in "neutral";

FIG. 9 is a cross-section taken along the line 9—9 in FIG. 8 at the lower end of the control rod acting between the handle mechanism and the pump control lever;

FIG. 10 is a view like FIG. 8, showing the position of the parts when the pump is in "forward"; and FIG. 11 is a view like FIG. 8, showing the position of the parts when the pump is in "reverse".

DETAILED DESCRIPTION

Figure 1:
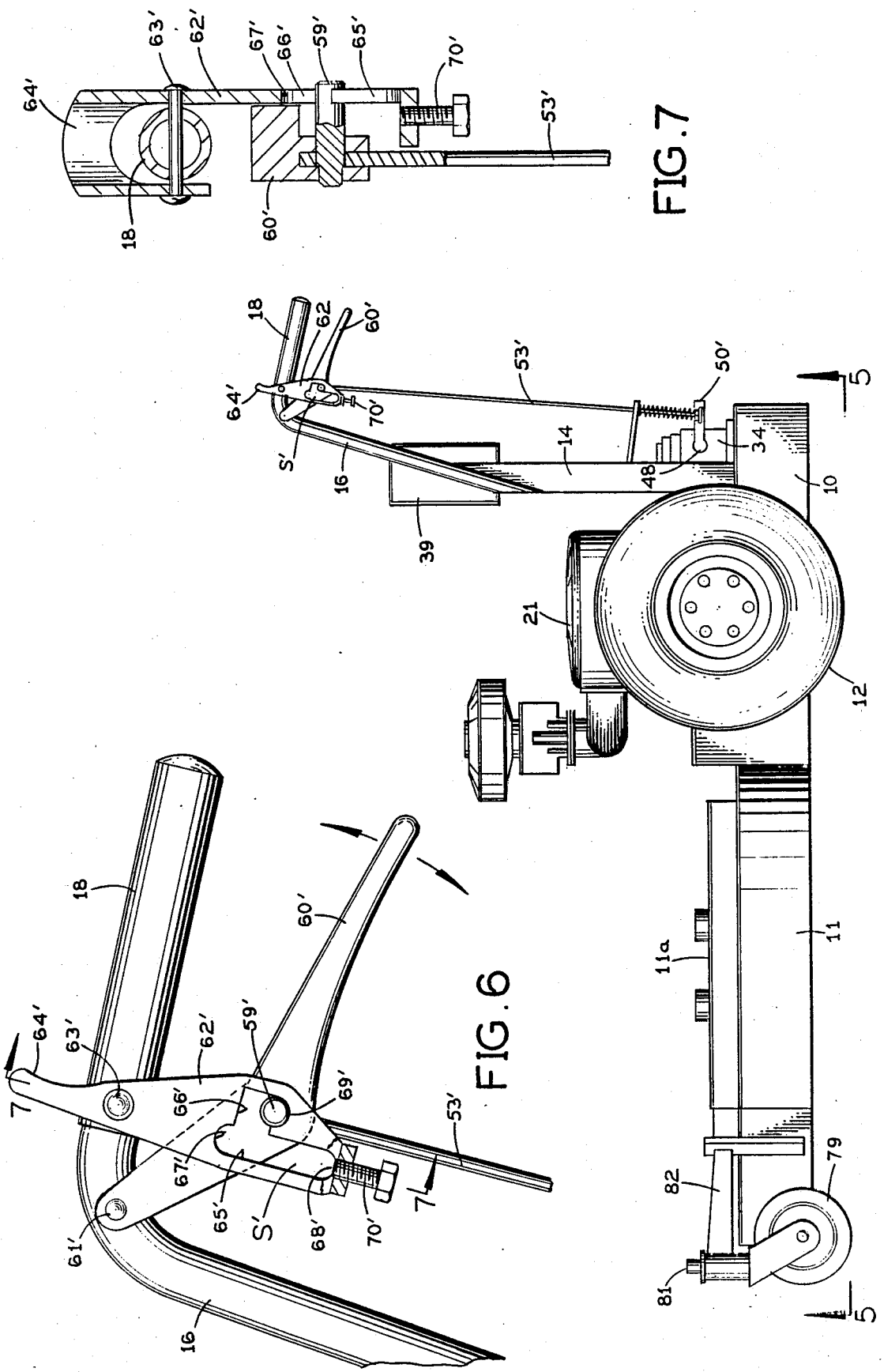
FIG. 1 is a side elevation of the present mower.
Figure 2:
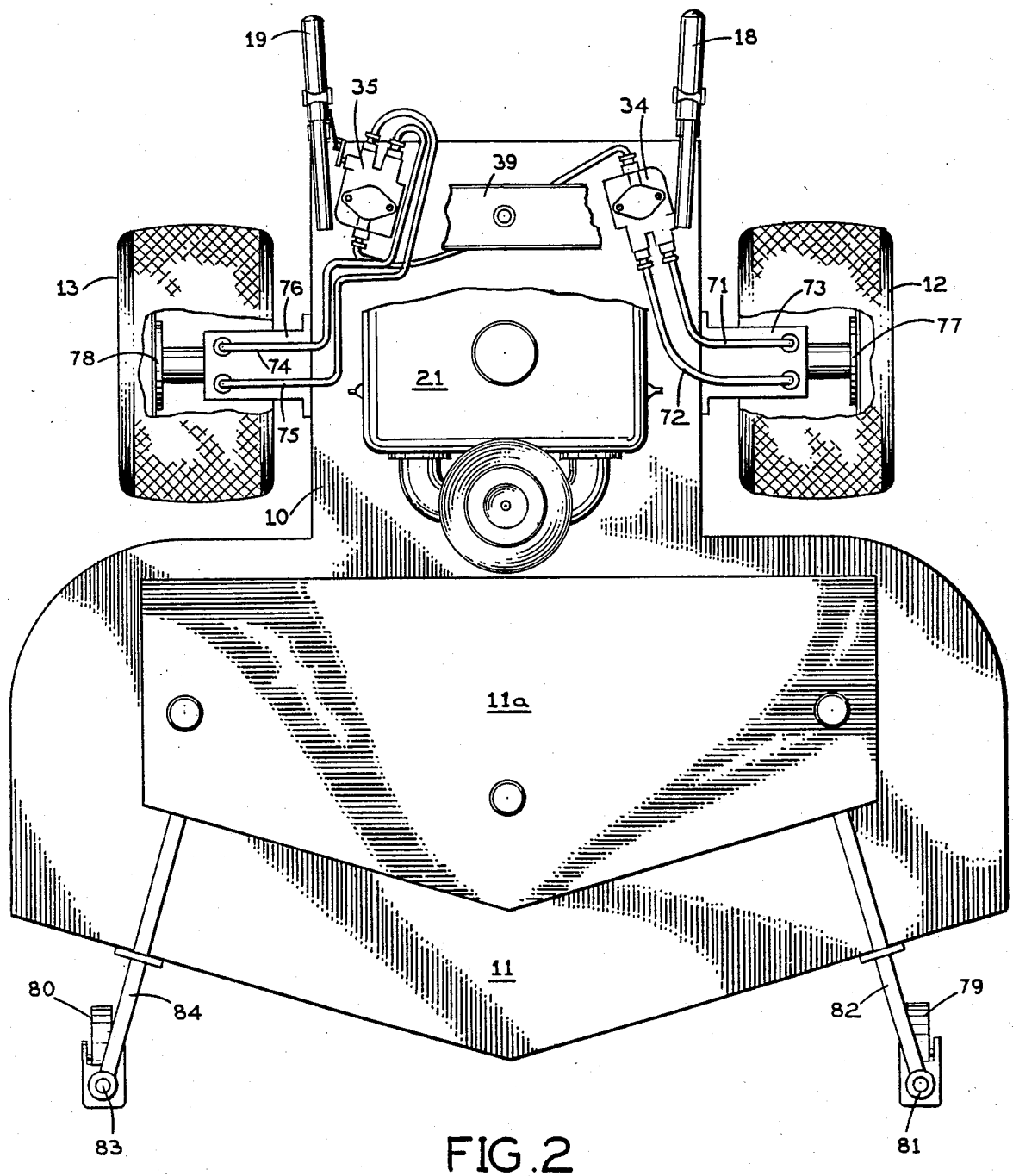
FIG. 2 is a top plan view with certain parts broken open.
Figure 3:
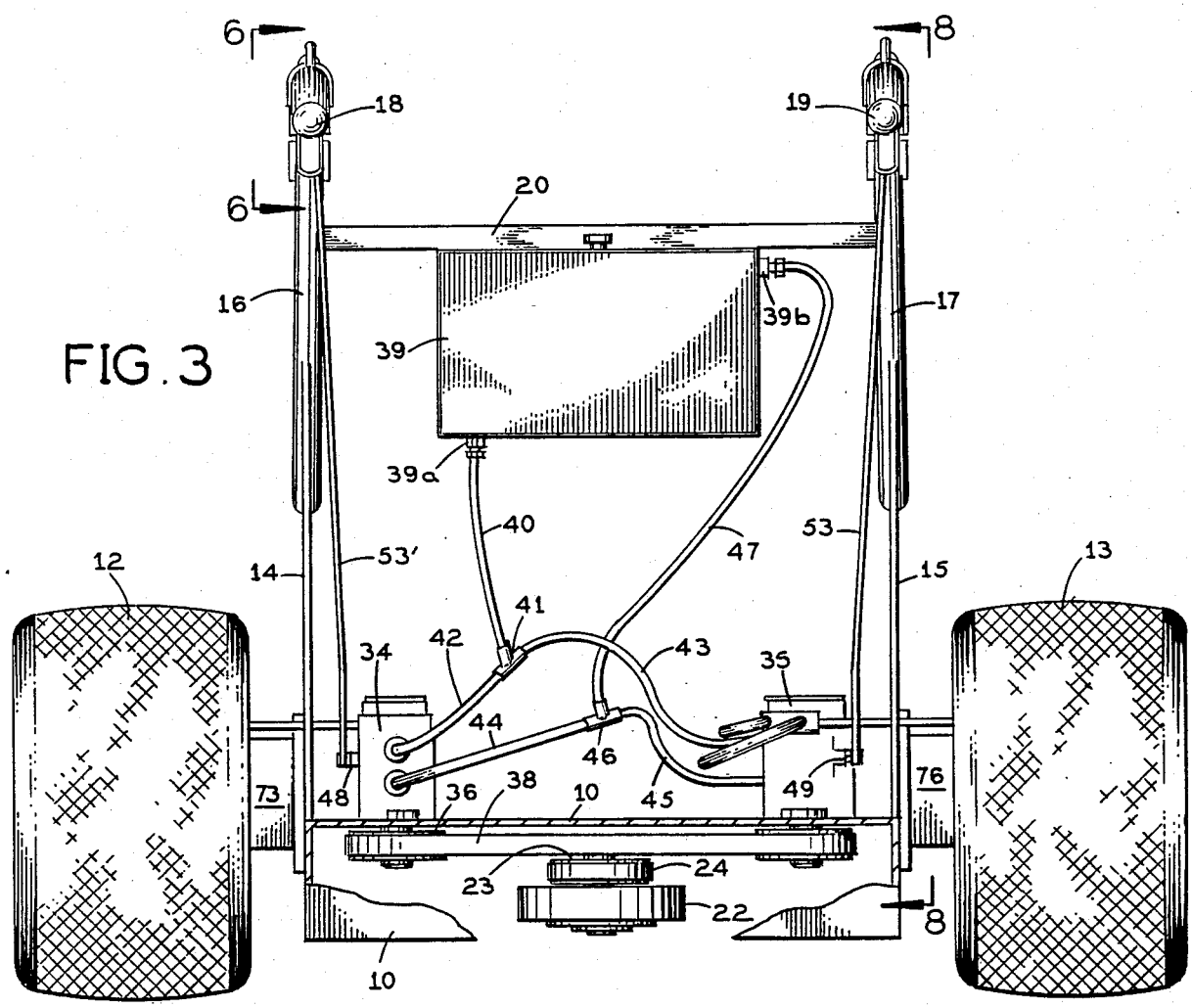
FIG. 3 is a rear elevation.

Referring to FIGS. 1 and 2, the mower of the present invention has a rigid framework including a generally horizontal deck or base with a rear section 10 and a front section 11 with a cover 11a on top. The rear section 10 of the deck extends between, and slightly in front of and behind, a pair of power-driven, ground-engaging, drive wheels 12 and 13 (FIGS. 2 and 3). The rigid framework of the mower also includes a pair of vertical standards 14 and 15 (FIGS. 1 and 3), which extend up from the rear section 10 of the deck at the rear of, and laterally in from, the left and right power-driven wheels 12 and 13, respectively. Handles 16 and 17 extend upward and rearward from standards 14 and 15, respectively, and present rearwardly extending, downwardly inclined handle bars 18 and 19, respectively, at their upper ends. The rigid framework also has a horizontal cross bar 20 (FIG. 3) extending between handles 16 and 17 a substantial distance above the rear section 10 of the deck.

An internal combustion engine 21 (FIG. 1) of known design is mounted on top of the rear section 10 of the deck between the power-driven wheels 12 and 13, as shown in FIG. 2. The center of gravity of this engine is located midway between these wheels. Engine 21 has a vertical output shaft which extends down through the rear section 10 of the deck to the input rotor of an electric clutch 22 (FIG. 3) of known design. Clutch 22 has an output rotor which carries a lower pulley 23 (FIG. 3). an upper pulley (not shown) which is immediately above and concentric with the lower pulley is driven directly by engine 21 (i.e.; independent of clutch 22).

Figure 5:
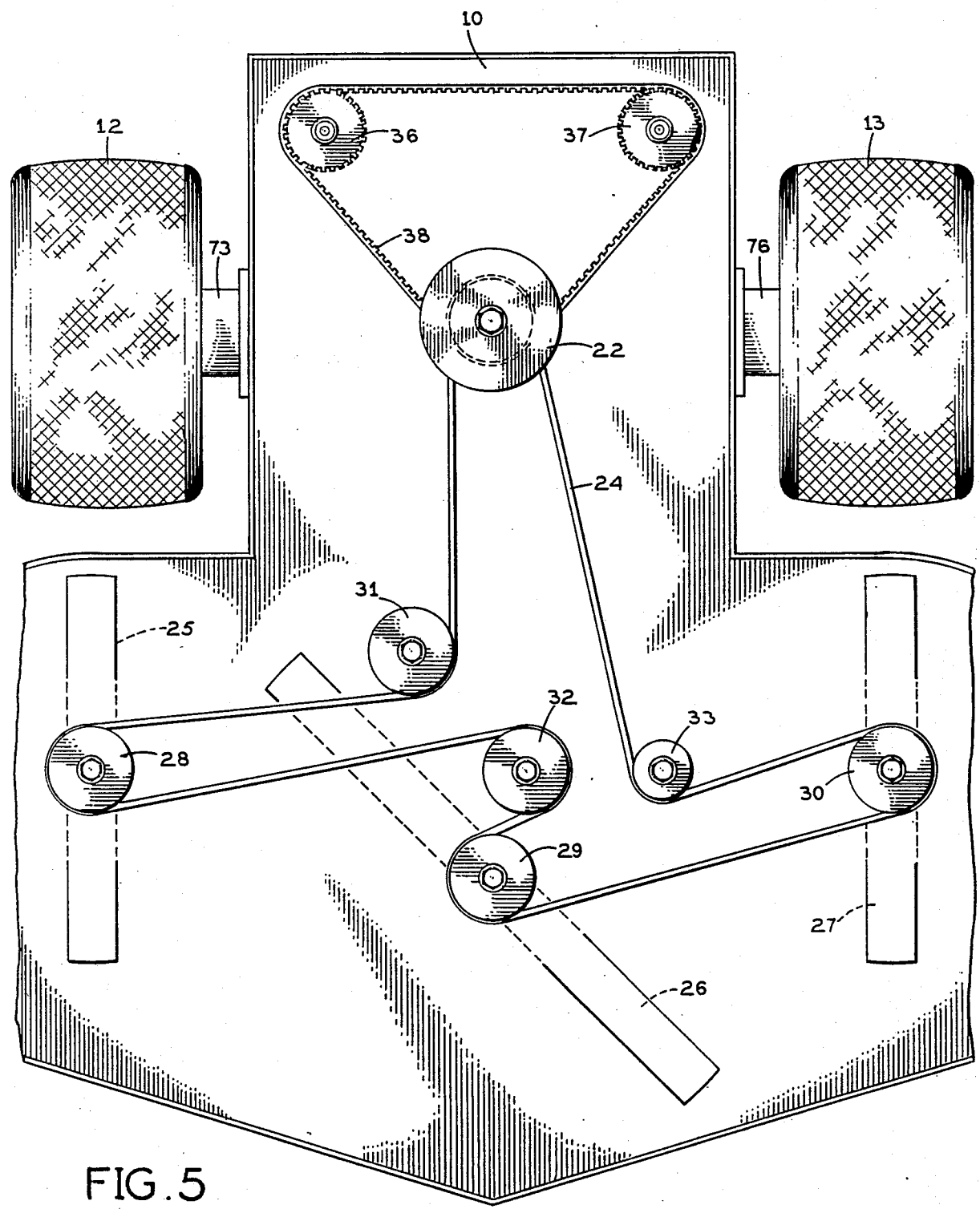
FIG. 5 is a simplified bottom plan view showing the belt drives for the cutters and the pumps in the present mower.

The lower pulley 23 drives an endless flexible belt 24 (FIG. 5) for driving three rotary cutting blades 25, 26 and 27, each having a vertical axis of rotation. Cutting blades 25 is located below the top of the front section 11 of the deck a short distance in front of the power-driven wheel 12 on the left side of the mower. Blade 27 is similarly positioned a short distance in front of the power-driven wheel 13 on the right side. Blade 26 is located about midway between blades 25 and 27 below the top of the front section of the deck. Cutting blade 25 is on the lower end of a vertical shaft whose upper end is fastened to a pulley 28 located between the front section 11 of the deck and its cover 11a. Blades 26 and 27 are similarly attached to respective pulleys 29 and 30, both located immediately below the cover 11a. An idler pulley 31 engages belt 24 between its drive pulley and the pulley 28 for the cutting blade 25 on the left side of the mower. An idler pulley 32 engages belt 24 between pulley 28 and the pulley 29 for the center cutting blade 26. An idler pulley 33 engages belt 24 between its drive pulley and the pulley 30 for the cutting blade 27 on the right side of the mower. With this arrangement, the engine 21 drives the three cutting blades 25, 26 and 27 in the same rotational direction through the endless drive belt 24 when the electric clutch 22 is engaged.

Two pumps 34 and 35 (FIGS. 2 and 3) are mounted directly on top of the rear section 10 of the deck just inside the respective standards 14 and 15. Pump 34 has a downwardly extending rotary input shaft which is rigidly attached to a toothed pulley 36 (FIGS. 3 and 5) located directly below the top of the rear section 10 of the deck. Similarly, pump 35 has a downwardly extending rotary input shaft rigidly attached to a toothed pulley 37 located directly below the top of the rear section 10 of the deck. A toothed flexible endless belt 38 (FIG. 5) extends around the pump pulleys 36 and 37 and around the upper pulley driven directly by engine 21. With this arrangement, the engine 21 drives the pumps 34 and 35 through belt 38.

A reservoir 39 (FIG. 3) for oil or other hydraulic fluid is rigidly attached to the cross bar 20 of the framework and extends down from it. This reservoir has an outlet port at 39a which is connected through a hose 40, a T-fitting 41 and a hose 42 to one side of the pump 34. The reservoir's outlet port 39a also is connected through hose 40, T-fitting 41 and a hose 43 to the corresponding side of the other pump 35. The opposite sides of the pumps are connected through respective hoses 44 and 45 to a T-fitting 46 and from there through a hose 47 to a port 39b on reservoir 39.

Each pump 34 and 35 is a reversible variable displacement pump of known design, preferably, the "Series 70-BDP 1OL" variable displacement pump of Sundstrand Corporation, Rockford, Illinois. Pump 34 has a rotatably adjustable control trunnion 48 (FIG. 3) which controls its fluid displacement and direction. Pump 35 has a rotatably adjustable control trunnion 49 which controls its fluid displacement and direction.

Figure 4:
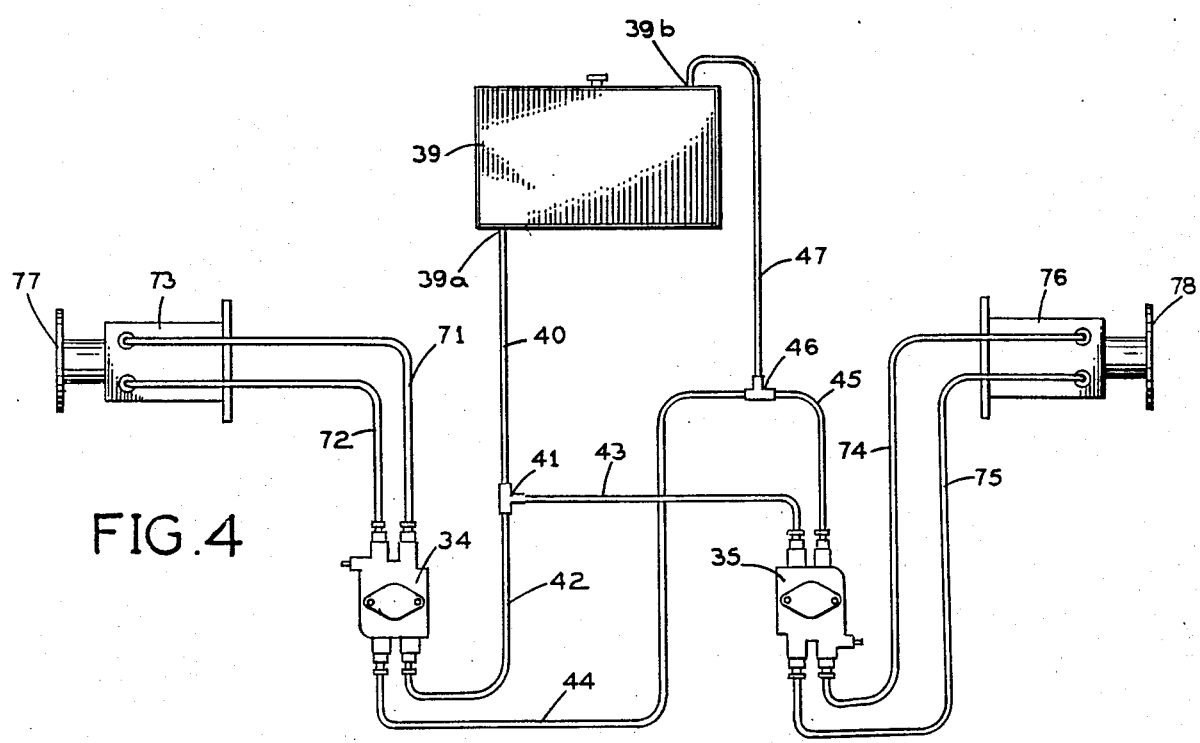
FIG. 4 is a schematic view illustrating the hydraulic circuitry including the hydraulic drive motors in this mower.

As shown schematically in FIG. 4, the pump 34 on the left side is connected through hoses 71 and 72 to the opposite sides of a hydraulic motor 73. Similarly, the pump 35 on the right side is connected through hoses 74 and 75 to the opposite sides of a hydraulic motor 76.

Referring to FIG. 2, the rotor of hydraulic motor 73 is connected directly to the rotary hub 77 of wheel 12 on the left side of the mower. Similarly, the rotor of the hydraulic motor 76 is connected directly to the rotary hub 78 of wheel 13 on the right side of the mower. Each hydraulic motor has a flanged housing which is directly mounted on the adjacent side of the front section 10 of the deck of the mower's framework.

The mower has a pair of vertically pivoted front wheels 79 and 80 (FIGS. 1 and 2) located on each side in front of the front section 11 of the mower's framework. The vertical pivot 81 for wheel 79 on the left side is supported by a rigid arm 82 projecting horizontally forward from the front section 11 of the mower deck and rigidly supported by it. Similarly, the vertical pivot 83 for wheel 80 on the right side is supported by a rigid arm 84 that extends horizontally forward from the front section 11 of the deck and is rigidly supported by it.

Referring to FIG. 8, the control trunnion 49 of pump 35 on the right side of the mower deck is rigidly attached to the front end of a control lever 50 for this pump. Toward its outer end, lever 50 carries a downwardly and rearwardly inclined cross piece 51. As shown in FIG. 9, cross-piece 51 has an opening 52 which loosely receives the screw-threaded lower end of a rigid elongated control rod 53, which extends up to a handle mechanism H (FIG. 8) on the fixed handle 17 and the handle bar 19. Control rod 53 passes up loosely through an opening 54 (FIG. 9) in a rigid bar 55, which is rigidly attached to the standard 15 and extends rearward from it at a slight downward angle, as shown in FIG. 8. A nut 56 threadedly receives the control rod 53 near its lower end and engages the top of cross-piece 51 on the pump control lever 50. A flat annular metal washer 57 engages the top of nut 56. A coil spring 58 is engaged under compression between bar 55 and washer 57, and it thereby exerts a downward force on the pump control lever 50.

The enlongated control rod 53 at its upper end is pivotally coupled to a horizontal cross pin 59 carried by a handle member 60 pivotally mounted at 61 on the upper end of the fixed handle 17, just in front of handle bar 19.

FIGS. 6 and 7 show in enlarged detail the corresponding elements associated with the pump 34 on the left side of the mower. These elements will now be described in detail, using a "prime" suffix for the reference numerals for the elements on this side and the same reference numerals, but without the "prime" suffix for the elements on the right side of the mower.

A locking lever 62' is pivoted at 63' to the handle bar 18 near its front end. Lever 62' has a projection 64' at the top which protrudes above the handle bar 18. Below its pivot 63', lever 62' has a slot S' with a longer front segment 65' that extends longitudinally of the lever down from its pivot 63' and a shorter transverse segment 66' that extends rearward from segment 65' close to its upper end. The longitudinal front segment 65' of slot S' presents a rounded semi-circular recess 67' at its upper end which is offset above the transverse segment 66' of the slot. At its lower end, the longitudinal segment 66' of slot S' presents a semi-circular recess 68' located a substantial distance below the transverse segment 66' of the slot. The transverse segment 66' of slot S' presents a downwardly offset semi-circular recess 69' at is back end (away from the longitudinal front segment 65' of the slot).

FIG. 6 shows the cross pin 59' on the handle member 60' seated in the recess 69' at the back end of transverse segment 66' of slot S'. However, it is to be understood that pin 59' can seat in the top recess 67' or the bottom recess 68' at the longitudinal front segment 65' of slot S'.

As shown in FIG. 7, a screw 70' is threadedly received in the bottom of the locking lever 62' laterally inward from its slot S'. This screw can be adjusted to project a selected distance above the bottom surface of the recess 69' for engagement by the cross pin 59' on the pivoted handle member 60', thereby limiting the extent to which pin 59' can move down along slot S' in the locking lever 62'.

FIG. 8 shows the position of the corresponding parts at the right side of the mower to put the pump 35 in "neutral", i.e., a mode in which it simply recirculates the hydraulic fluid without driving the hydraulic motor 76 in either direction. In this position, the cross pin 59 on the pivoted handle member 60 is seated in the bottom recess 69 at the back end of the transverse segment 66 of slot S in locking lever 62. Also, in this position the control lever 50 for pump 34 is substantially horizontal.

FIG. 10 shows the position of these parts to put the pump 35 in "forward", i.e., the mode in which it drives the hydraulic motor 76 in a direction to propel the corresponding mower wheel 13 forward. In this position, the cross pin 59 on pivoted handle member 60 engages the upper end of bolt 70 or the front bottom recess 68 of slot S in locking lever 62, whichever is higher. The coil spring 58 pushes the parts down to this position and it moves the pump control lever 50 down. To put the parts in this position, the user raises the handle member 60 enough to move its cross pin 59 up out of the bottom recess 69 at the back end of the transverse segment 66 of the slot S in the locking lever 62. Then the user moves the top projection 64 of the locking lever back, pivoting the locking lever counterclockwise in FIG. 8 to the position shown in FIG. 10. When the cross pin 59 reaches the longitudinal front segment 65 of slot S, the user releases the pivoted handle 60, which permits spring 58 to pull the elongated control rod 53 down to the position shown in FIG. 10. This position is determined by the location of the upper end of screw 70 or the location of the bottom recess 68 in the longitudinal front segment 65 of slot S in locking bracket 62, whichever is higher. This angular position of the pump control lever 50 (below the horizontal) determines the fluid displacement rate of the pump 35. The farther up the bolt 70 projects into slot S, the less the fluid displacement rate, and therefore, the slower the speed of the corresponding hydraulic motor 76 and the slower the rotational speed of wheel 13.

FIG. 11 shows the position of the parts to put the pump in "reverse", i.e., the mode in which it drives the hydraulic motor 76 in a direction to propel the mower wheel 13 rearward. In this position the cross pin 59 on the pivoted handle member 60 engages the upper end recess 67 of the longitudinal front segment 65 of slot S in the pivoted locking lever 62. This is achieved by pulling up on the pivoted handle 60 and holding it up, and pushing forward on the top projection 64 of lever 62 to pivot it clockwise in FIGS. 8, 10 and 11. Pulling up on the handle 60 raises the elongated control rod 53 and pivots the pump control lever 50 up (above the horizontal) to a position in which the direction of pump 35 is reversed from the direction it operates in when the parts are positioned as shown in FIG. 10. The location of the upper end recess 67 in slot S in the locking bracket is such that the pump's fluid displacement is substantially less in reverse than in forward. This is for the safety of the person operating the mower. It will be evident that when the fluid displacement direction of pump 35 is reversed, as described, the direction of the hydraulic motor 76 is similarly reversed, as is the rotational direction of wheel 13.

With this arrangement at each handle of the mower, the person using it has direct control over the direction of the ground wheel 12 or 13 on that side of the mower. The user can set the pivoted handles 60 and 60' and the locking levers 62 and 62' to drive both wheels forward, or both wheels in reverse, or one wheel forward and the other in reverse for a sharp turn, or one wheel forward while the other pump is in neutral for a more gradual turn, or stop the mower's movement along the ground by putting both pumps in neutral. The user can quickly start and stop the mower's movement and change the direction of either wheel 12 and 13 by one-hand manipulation of the pivoted handle 60 and the locking lever 62 on that side of the mower. Therefore, the mower is ideally suited for walk-behind operation by one person where frequent stops, starts and turns may be encountered, such as at trees, bushes or flower beds.

Another practical advantage of the present invention is that the weight of the engine 21 and the hydraulic motors 73 and 76 is substantially centered at the axis of wheels 12 and 13, the weight of the pumps 34 and 35 is behind this axis, and the weight of the reservoir 39 is behind and above this axis. This makes it easy for the user to gain access to the cutting blades (e.g., to replace them or to remove debris from them) by tilting up the front section of the mower deck by exerting a downward force on the handle bars 18 and 19.

From the foregoing description and the accompanying drawings it will be evident that the disclosed embodiment of the present invention enables walk-behind operation coupled with convenient control by the user over the direction and speed of the mowing operation.

I claim:
1. A walk-behind mower comprising:
a rigid framework including a deck with a front section and a rear section;
first and second laterally spaced, vertically pivoted, directional wheels supported from said deck at the front of said front section of the deck;
first and second ground-engaging drive wheels on opposite sides of said rear section of said deck, each of said wheels having an axial hub;
first and second hydraulic motors, each having a rotor attached directly to said hub of a corresponding drive wheel;
first and second variable displacement, reversible pumps mounted on top of said rear section of said deck behind said drive wheels, said first and second pumps being respectively connected hydraulically to said motors to drive said motors individually, each of said pumps having a rotatably adjustable trunnion controlling the direction and fluid displacement of said pump;
a hydraulic reservoir supported by said framework and connected to said pumps and motors to provide hydraulic fluid for operating said motors;
rotary cutters below said front section of said deck in front of said drive wheels;
an internal combustion engine mounted on top of said rear section of said deck between said drive wheels, said engine having a rotary output shaft extending below said rear section of said deck;
first pulley means on said output shaft of said engine below said rear section of the deck;
first endless flexible belt means driven by said first pulley means and driving said pumps;
second pulley means below said rear section of the deck;
an electric clutch below said rear section of the deck driven by said engine and driving said second pulley means;
second endless flexible belt means driven by said second pulley means and driving said cutters;
first and second manually operable handle mechanisms on said framework at laterally spaced positions above and behind said rear section of the deck;
first and second elongated control rods extending generally vertically down from said first and second handle mechanisms, respectively, and operable to be raised and lowered individually by said handle mechanisms;
and first and second linkage means respectively acting between said first and second control rods and said rotatably adjustable trunnions of said first and second pumps to control the fluid displacement and direction of each pump in accordance with the setting of the corresponding handle mechanism.
2. A mower according to claim 1 wherein: said framework has a cross bar spaced above said rear section of the deck behind the hubs of said drive wheels, and said hydraulic reservoir is mounted on said cross bar.
3. A mower according to claim 2 wherein:
said control trunnion of each pump is rotatably adjustable selectively to (a) a first position causing the pump to recirculate hydraulic fluid without driving the corresponding hydraulic motor, (b) a second position causing the pump to drive the corresponding hydraulic motor in a direction propelling the corresponding drive wheel forward, and (c) a third position causing the pump to drive the corresponding hydraulic motor in a direction propelling the corresponding drive wheel rearward;

said framework includes first and second fixed handles extending up from opposite sides of said rear section of the deck and each having a rearwardly extending handle bar at its upper end;

and each of said handle mechanisms comprises:

a pivoted handle member pivotally mounted on the corresponding fixed handle and extending beneath the corresponding handle bar, said pivoted handle member having a cross rod connected to the upper end of the corresponding elongated control rod for raising and lowering said control rod by pivotally raising and lowering said pivoted handle member;

and a locking lever pivotally mounted on the corresponding handle bar and having a slot which slidably receives said cross rod on the corresponding pivoted handle member, said slot having (a) a first recess for engagement by said cross rod to hold the corresponding elongated control rod in a position maintaining said control trunnion of the corresponding pump in said first position thereof, (b) a second recess for engagement by said cross rod to hold the corresponding elongated control rod in a position maintaining said control trunnion of the corresponding pump in said second position thereof, and (c) a third recess for engagement by said cross rod to hold the corresponding elongated control rod in a position maintaining said control trunnion of the corresponding pump in said third position thereof.

4. A mower according to claim 3 wherein:

said slot in each locking lever has a front segment which extends down from the pivotal connection of said lever to the corresponding handle bar and a transverse segment which intersects and extends behind said front segment;

said first recess in each slot is a downwardly offset recess at the back end of said transverse segment of said slot;

said second recess in each slot is at the lower end of said front segment of said slot;

and said third recess in each slot is at the upper end of said front segment of said slot and is upwardly offset from said transverse segment of said slot.

5. A mower according to claim 4, wherein said locking lever in each of said handle mechanisms has a screw which is threadedly adjustable to project a selected amount up into the lower end of said front segment of said slot in said locking lever for engagement by said cross rod.

6. A mower according to claim 5 wherein:

the weight of said engine and each of said hydraulic motors is substantially centered at the axis of said drive wheels;

and said pumps are behind said axis.

7. A mower according to claim 1 wherein:

said control trunnion of each pump is rotatably adjustable selectively to (a) a first position causing the pump to recirculate hydraulic fluid without driving the corresponding hydraulic motor, (b) a second position causing the pump to drive the corresponding hydraulic motor in a direction propelling the corresponding drive wheel forward, and (c) a third position causing the pump to drive the corresponding hydraulic motor in a direction propelling the corresponding drive wheel rearward;

said framework includes first and second fixed handles extending up from opposite sides of said rear section of the deck and each having a rearwardly extending handle bar at its upper end;

and each of said handle mechanisms comprises:

a pivoted handle member pivotally mounted on the corresponding fixed handle and extending beneath the corresponding handle bar, said pivoted handle member having a cross rod connected to the upper end of the corresponding elongated control rod for raising and lowering said control rod by pivotally raising and lowering said pivoted handle member;

and a locking lever pivotally mounted on the corresponding handle bar and having a slot which slidably receives said cross rod on the corresponding pivoted handle member, said slot having (a) a first recess for engagement by said cross rod to hold the corresponding elongated control rod in a position maintaining said control trunnion of the corresponding pump on said first position thereof, (b) a second recess for engagement by said cross rod to hold the corresponding elongated control rod in a position maintaining said control trunnion of the corresponding pump in said second position thereof, and (c) a third recess for engagement by said cross rod to hold the corresponding elongated control rod in a position maintaining said control trunnion of the corresponding pump in said third position thereof.

8. A mower according to claim 7 wherein:

said slot in each locking lever has a front segment which extends down from the pivotal connection of said lever to the corresponding handle bar and a transverse segment which intersects and extends behind said front segment;

said first recess in each slot is a downwardly offset recess at the back end of said transverse segment of said slot;

said second recess in each slot is at the lower end of said front segment of said slot;

and said third recess in each slot is at the upper end of said front segment of said slot and is upwardly offset from said transverse segment of said slot.

9. A mower according to claim 8, wherein said locking lever in each of said handle mechanisms has a screw which is threadedly adjustable to project a selected amount up into the lower end of said front segment of said slot in said locking lever for engagement by said cross rod.

10. A mower according to claim 1 wherein:

the weight of said engine and each of said hydraulic motors is substantially centered at the axis of said drive wheels;

and said pumps are behind said axis.

11. A walk-behind mower comprising:

a rigid framework including a deck;

laterally spaced directional wheels supported from said deck at the front;

first and second ground-engaging drive wheels on opposite sides of said deck, each of said wheels having a axial hub;

first and second hydraulic motors, each having a rotor driving said hub of a corresponding drive wheel;

first and second variable displacement, reversible pumps mounted on top of said deck, said first and second pumps being respectively connected hydraulically to said motors to drive said motors individually, each of said pumps having rotatably adjustable means controlling the direction and fluid displacement of said pump;

a hydraulic reservoir supported by said framework and connected to said pumps and motors to provide hydraulic fluid for operating said motors;

rotary cutters below said deck;

an internal combustion engine mounted on top of said deck and having a rotary output shaft;

drive means acting between said output shaft of the engine and said pumps for driving said pumps from said engine;

drive means including a clutch acting between said output shaft of the engine and said cutters for driving said cutters from said engine;

first and second manually operable handle mechanisms on said framework at laterally spaced positions above said deck;

first and second control rods extending down from said first and second handle mechanisms, respectively, and operable to be raised and lowered individually by said handle mechanisms;

and first and second linkage means, respectively, acting between said first and second control rods and said rotatably adjustable means on said first and second pumps to control the fluid displacement and direction of each pump in accordance with the setting of the corresponding handle mechanism.

12. A mower according to claim 11 wherein:

said framework has a cross bar spaced above said rear section of the deck behind the hubs of said drive wheels, and said hydraulic reservoir is mounted on said cross bar.

13. A mower according to claim 11 wherein:

said rotatably adjustable means on each pump is rotatably adjustable selectively to (a) a first position causing the pump to recirculate hydraulic fluid without driving the corresponding hydraulic motor, (b) a second position causing the pump to drive the corresponding hydraulic motor in a direction propelling the corresponding drive wheel forward, and (c) a third position causing the pump to drive the corresponding hydraulic motor in a direction propelling the corresponding drive wheel rearward;

said framework includes first and second fixed handles extending up from opposite sides of said rear section of the deck and each having a rearwardly extending handle bar at its upper end and each of said handle mechanisms comprises:

a pivoted handle member pivotally mounted on the corresponding fixed handle and extending beneath the corresponding handle bar, said pivoted handle member having a cross rod connected to the upper end of the corresponding elongated control rod for raising and lowering said control rod by pivotally raising and lowering said pivoted handle member;

and a locking lever pivotally mounted on the corresponding handle bar and having a slot which slidably receives said cross rod on the corresponding pivoted handle member, said slot having (a) a first recess for engagement by said cross rod to hold the corresponding elongated control rod in a position maintaining said rotatably adjustable means on the corresponding pump in said first position thereof, (b) a second recess for engagement by said cross rod to hold the corresponding elongated control rod in a position maintaining said rotatable adjustable means on the corresponding pump in said second position thereof, and (c) a third recess for engagement by said cross rod to hold the corresponding elongated control rod in a position maintaining said rotatably adjustable means on the corresponding pump in said third position thereof.

14. A mower according to claim 13, wherein:

said slot in each locking lever has a front segment which extends down from the pivotal connection of said lever to the corresponding handle bar and a transverse segment which intersects and extends behind said front segment;

said first recess in each slot is a downwardly offset recess at the back end of said transverse segment of said slot;

said second recess in each slot is at the lower end of said front segment of said slot;

and said third recess in each slot is at the upper end of said front segment of said slot and is upwardly offset from said transverse segment of said slot.

15. A mower according to claim 14, wherein said locking lever in each of said handle mechanisms has a screw which is threadedly adjustable to project a selected amount up into the lower end of said front segment of said slot in said locking lever for engagement by said cross rod.

16. A mower according to claim 9 wherein:

the weight of said engine and each of said hydraulic motors is substantially centered at the axis of said drive wheels;

said pumps are behind said axis;

and said reservoir is behind said axis.

* * * * *